US008831926B2

(12) United States Patent
Van der Velden (10) Patent No.: US 8,831,926 B2
(45) Date of Patent: Sep. 9, 2014

(54) VERIFICATION OF CYBER-PHYSICAL SYSTEMS USING OPTIMIZATION ALGORITHMS

(75) Inventor: Alexander Jacobus Maria Van der Velden, Atlanta, GA (US)

(73) Assignee: Dassault Systemes Simulia Corp., Providence, RI (US)

( * ) Notice: Subject to any disclaimer, the term of this patent is extended or adjusted under 35 U.S.C. 154(b) by 379 days.

(21) Appl. No.: 13/469,957

(22) Filed: May 11, 2012

(65) Prior Publication Data

US 2013/0304440 A1 Nov. 14, 2013

(51) Int. Cl.
*G06F 17/50* (2006.01)
*G06Q 30/00* (2012.01)
*G06F 11/22* (2006.01)

(52) U.S. Cl.
CPC .......... *G06F 11/2247* (2013.01); *G06Q 30/018* (2013.01)
USPC .................. 703/14; 703/6; 716/106

(58) Field of Classification Search
CPC ............... G06F 7/00; G06F 9/44; G06F 9/45; G06F 11/00; G06F 11/07; G06F 15/173; G06F 17/00; G06F 17/30; G06F 17/50; G06G 9/48; G06N 5/02; G06N 7/00; G06Q 10/00; G06Q 30/018; G06Q 40/00; G06Q 40/06; G08B 23/00; G01R 31/08; G01R 31/3187; H04J 3/06; H04L 12/28; H04M 3/42
USPC ......... 703/6, 7, 13, 14; 370/254, 503; 726/13; 716/104, 106; 714/32, 37; 705/10
See application file for complete search history.

(56) References Cited

U.S. PATENT DOCUMENTS

| 6,154,801 | A | 11/2000 | Lowe et al. |
| 6,560,757 | B1 | 5/2003 | Ballam |
| 6,618,841 | B1 | 9/2003 | Huang |
| 2002/0128809 | A1 | 9/2002 | Roesner et al. |
| 2009/0122812 | A1* | 5/2009 | Steiner et al. ................. 370/503 |
| 2009/0132227 | A1 | 5/2009 | Takada et al. |
| 2009/0222921 | A1* | 9/2009 | Mukhopadhyay et al. ..... 726/23 |
| 2009/0313091 | A1* | 12/2009 | Bloom et al. .................. 705/10 |
| 2011/0066889 | A1* | 3/2011 | Kikuchi ......................... 714/32 |
| 2011/0246831 | A1* | 10/2011 | Das et al. ........................ 714/37 |
| 2012/0243438 | A1* | 9/2012 | Steiner et al. ................. 370/254 |
| 2013/0019216 | A1* | 1/2013 | Vasudevan et al. ........... 716/106 |
| 2013/0290918 | A1* | 10/2013 | Baumgartner et al. ....... 716/104 |

OTHER PUBLICATIONS

Toolbox.com Ask-a-Question, "Software Quality Metrics" [online], May 5, 2010 [retrieved May, 2012], 4 pages. Retrieved from the Internet URL: http://it.toolbox.com/wiki/index.php/Software_Quality_Metrics.

Marquis, H., "Fault Tree Analysis Made Easy," *DITY™ Newsletter*, 1.5: 1-3 [online], Dec. 14, 2005 [retrieved May, 2012]. Retrieved from the Internet URL: http://www.itsmsolutions.com/newsletters/DITYvolliss5.htm.

* cited by examiner

*Primary Examiner* — Kandasamy Thangavelu
(74) *Attorney, Agent, or Firm* — Hamilton, Brook, Smith & Reynolds, P.C.

(57) ABSTRACT

A computer-implemented method for verifying a model in a product lifecycle management (PLM) system includes defining a model and an envelope of allowable model states and, based on one or more requirements, deriving at least one counterexample objective. The method also includes optimizing a set of parameters related to the allowable model states and the allowable model context, redefining at least one of the model and the allowable model states when the at least one counterexample objective is outside of a specified tolerance, and, after a predefined number of iterations, defining the model as verified.

20 Claims, 9 Drawing Sheets

VERIFICATION OF CYBER-PHYSICAL SYSTEMS USING OPTIMIZATION ALGORITHMS

BACKGROUND OF THE INVENTION

The embodiments described herein relate generally to modeled object simulations and, more particularly, to simulations and systems certification.

Generally, cyber-physical systems include both computational and physical elements that are combined and coordinated in operation. One example of a cyber-physical system is an embedded system, such as those used with automobiles (e.g., stability augmentation, ABS systems) and aircraft (e.g., flutter control systems). A characteristic of at least some known cyber-physical systems is that such systems have infinite states.

At least some known simulation systems use fault trees and/or reachability analysis to certify finite state systems, whereby possible system failures are determined by combining one or more known causes and/or faults. However, because fault trees and reachability analysis cannot generally be used with systems of infinite states, these tools are not usable for examining cyber-physical systems.

Other known simulations systems use statistical analysis, such as Monte Carlo simulations, to certify infinite state systems. In such a statistical analysis, calculations of system performance are repeatedly made based on randomly selected values and probability distributions that describe each element of a model. However, some failure events of cyber-physical are so rare that Monte Carlo simulations are not useful for examining these cyber-physical systems because the dataset would be too large. As cyber-physical systems, in the embodiment of embedded systems, become more common and are used in more critical devices, these rare failure modes are becoming more and more important.

BRIEF DESCRIPTION OF THE INVENTION

In one aspect, a computer-implemented method is provided for verifying a model in a product lifecycle management (PLM) system. The computer-implemented method includes defining a model, an allowable model context, and an envelope of allowable model states and, based on one or more requirements, deriving at least one counterexample objective. The method also includes optimizing a set of parameters related to the allowable model states and the allowable model context, redefining the model and/or the allowable model states when the counterexample objective is outside of a specified tolerance, and, after a predefined number of iterations, defining the model as verified.

In another aspect, a computer is provided for use in verifying a model in a product lifecycle management (PLM) system. The computer includes a memory area configured to store a model, an allowable model context, and an envelope of allowable model states, and a processor coupled to the memory area. The processor is configured to derive at least one counterexample objective based on one or more requirements, optimize a set of parameters related to the allowable model states and the allowable model context, redefine the model and/or the allowable model states when the counterexample objective is outside of a specified tolerance, and define the model as verified after a predefined number of iterations.

In another aspect, a computer program product includes one or more non-transitory computer-readable storage media having computer-executable components thereon for use in verifying a model in a product lifecycle management (PLM) system. The components include an input component that when executed by a processor causes the processor to define a model, an allowable model context, and an envelope of allowable model states. The components also include an iterative analysis component that causes the processor to derive at least one counterexample objective based on one or more requirements, optimize a set of parameters related to the allowable model states and the allowable model context, redefine the model and/or the allowable model states when the counterexample objective is outside of a specified tolerance, and define the model as verified after a predefined number of iterations.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

Exemplary embodiments of computer-implemented methods, computer systems, computer architectures, and computer program products for use in qualifying a model in a product lifecycle management (PLM) system are described herein. The embodiments described herein facilitate certifying cyber-physical systems even with rare failure modes (e.g., failures occurring less than once every 10,000 operations). Rather than certifying based on probabilities, the embodiments described herein use falsification (e.g., counterexamples) to prove that a failure point exists. As long as failure points can be identified within a specified analysis duration or number of analysis iterations, the rare event will not be certified. Moreover, each possible failure point is fixed until a new failure point cannot be located within the specified time or number of iterations. Accordingly, the embodiments described herein facilitate enhanced efficiency failure identification within a cyber-physical system. As is known in the art, the standard form of a continuous optimization problem is shown in Expression (1):

minimize f(x)

subject to $g_i(x) \leq 0$, $i=1,\ldots,m$ subject to $h_i(x)=0$, $i=1,\ldots,p$ where $f(x): \mathbb{R}^n \to \mathbb{R}$ is the objective function to be minimized over the variable x, $g_i(x) \leq 0$ are called inequality constraints, and $h_i(x)=0$ are called equality constraints.

The original product problem definition x is modified to a counterexample formulation such as to maximize $g_i(z)$, which is to maximize a constraint violation, or to maximize $|h_i(z)|$, which is to maximize an inequality, for z being the operational space and/or the undefined product design space. The embodiments described herein use counterexample optimization to determine whether there are solutions that are the opposite of what the design is intended to achieve.

Figure 1:
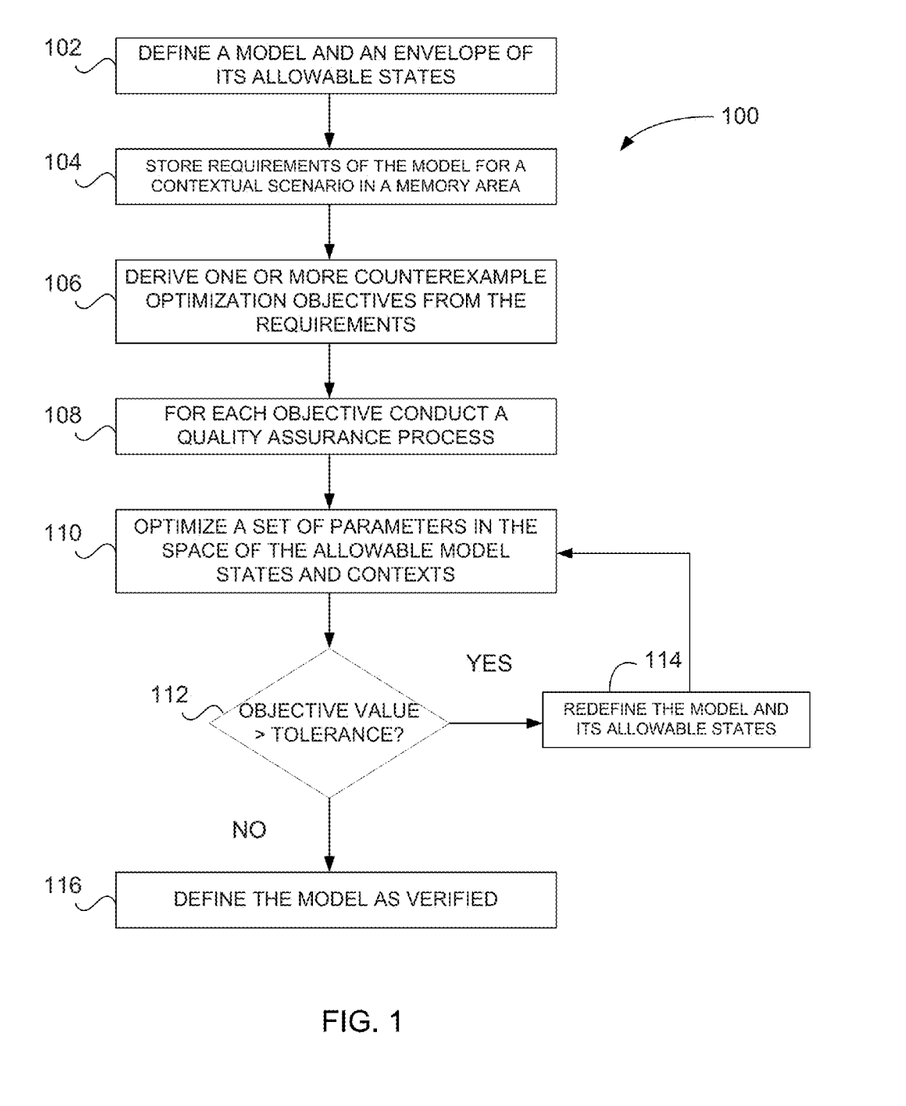
FIG. 1 is a flowchart that illustrates an exemplary computer-implemented method for verifying a model in a product lifecycle management (PLM) system.

FIG. 1 is a flowchart 100 that illustrates an exemplary computer-implemented method for verifying a model in a product lifecycle management (PLM) system. In an exemplary embodiment, a model $x_i$ and an envelope of its allowable states $x_j$ during an operational scenario are defined 102 and stored in a memory area, wherein the envelope of the allowable states during an operational scenario envelope includes a plurality of parameters to be optimized during operation and/or simulation analysis of the model. Next, the requirements of model $x_i$ in the form of inequality constraints $g_i(x) < 0$ and/or equality constraints $h_i(x) = 0$ for a scenario in its context $x_k$, min<$x_k$<max are stored in a memory area 104. The context of a scenario includes, but is not limited to terrain, water wave amplitude, wind, rainfall, corrosion, thermal dispersion, particle size, electromagnetic signal and noise (e.g., from solar radiation), and the like. A counterexample optimization objective $O_i$ is derived from the requirements 106. For example, an objective $O_i$ whereby $g_i$ is maximized, can be derived from inequality constraint $g_i < 0$. Similarly, an objective whereby the absolute value of $h_i$ is maximized can be derived from equality constraint $h_i$. Next, for each objective $O_i$ in a verification scenario, a quality assurance process is conducted 108 to optimize 110 a set of parameters in the space of model states $x_k$ and context $x_k$. If a value of the objective $O_i$ is determined 112 to exceed a tolerance $\epsilon$, the model $x_i$ and its allowable states $x_j$ are redefined 114 to correct the verification error. Next, the process is repeated at 110 until no additional failures $O_i > \epsilon$ are found after a preset number of iterations of this approach. For example, the process repeats until a mean number of exchanges between failures (MEBF) is reached. In such an embodiment, a number of sequential failures of the model is recorded in the memory area and the operational and/or simulation analysis of the model is performed until the specified MEBF is recorded. In that case the model is defined 116 as verified (or qualified) with respect to requirements $g_i(x) < 0$ and/or $h_i(x) = 0$.

Figure 2A:
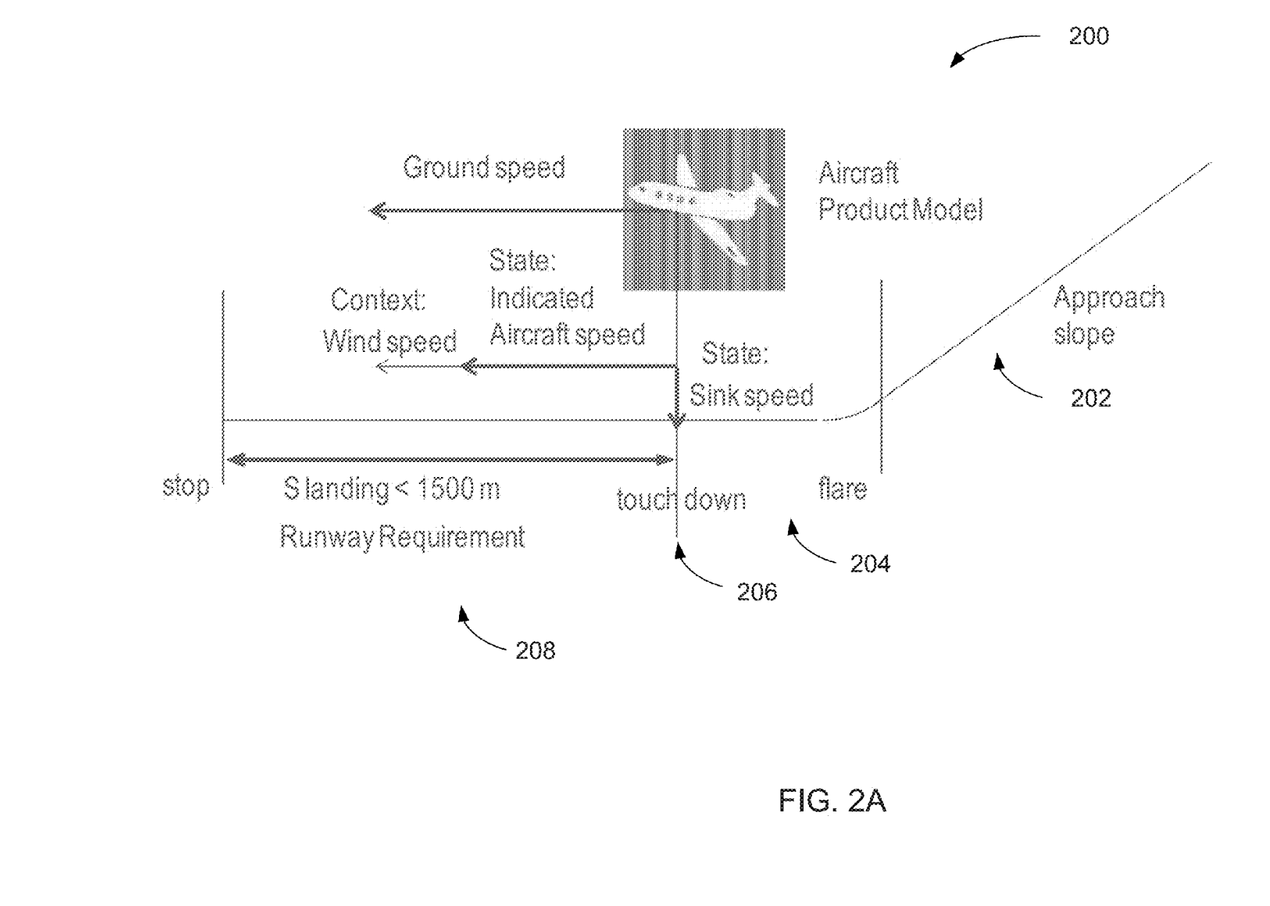
FIGS. 2A-2F illustrate an example of the use of the counterexample optimization verification process described herein.

FIGS. 2A-2F illustrate an example of the use of counterexample optimization verification of virtual prototyping using the landing of a commercial airplane equipped with wheel brakes and thrust reversers during heavy wind conditions. FIG. 2A shows the general sequence 200 of an aircraft landing. This scenario can be simulated with an aircraft model simulation whereby the optimization software controls the pilot stick-commands to achieve aircraft state targets, in this case a set sink speed at the aiming point. A normal landing consists out of an approach at a fixed slope 202, a flare 204 whereby the aircraft nose is pulled up and the vertical (sink) speed is reduced, touch-down 206, and breaking 208 using a combination of wheel brakes and thrust reversers until the aircraft stops at the end of the roll.

Figure 2B:
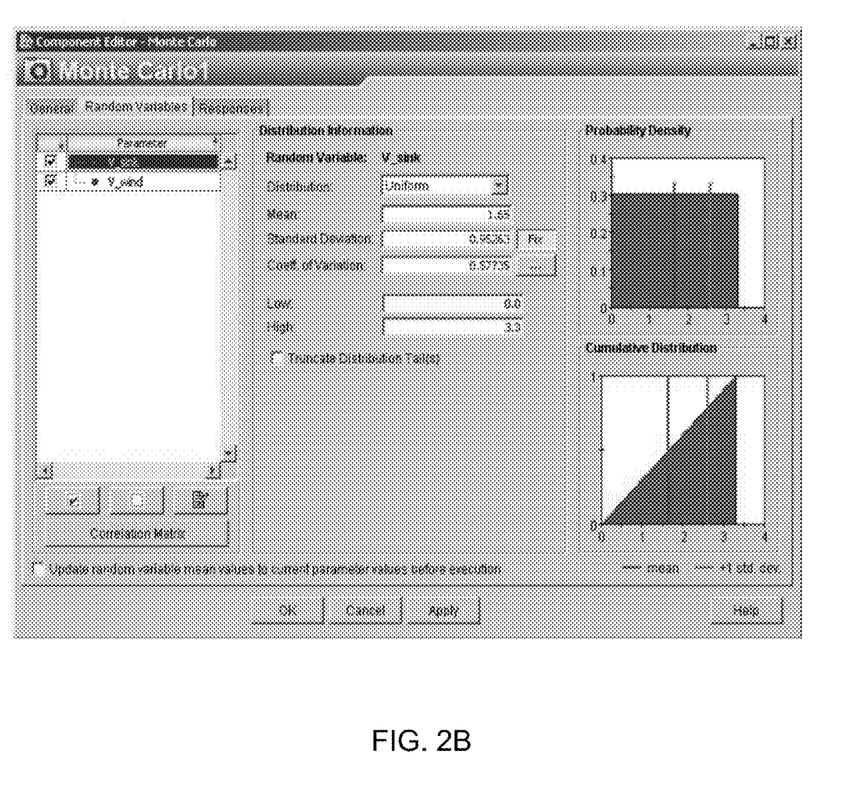
Figure 2C:
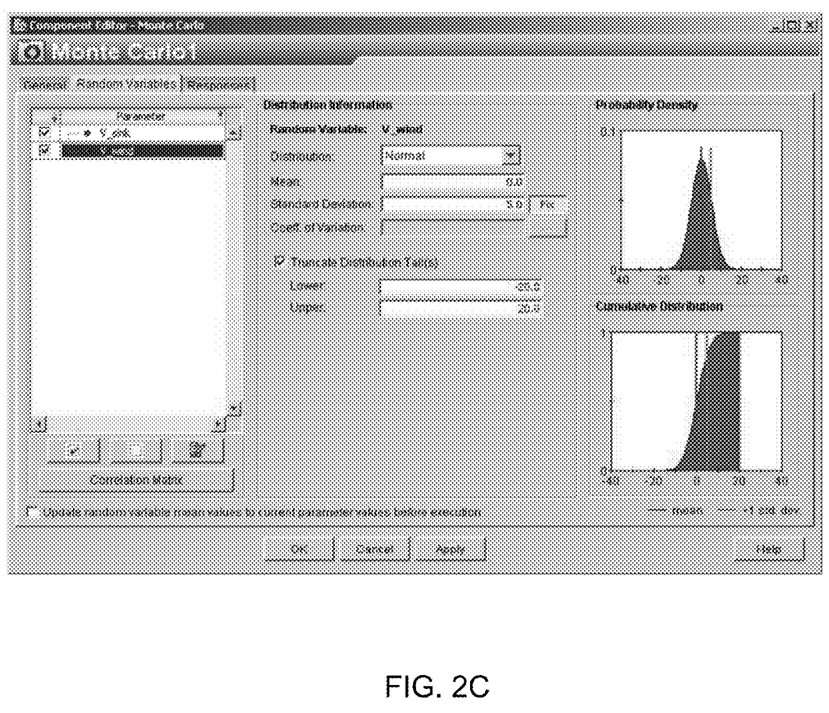
Figure 2D:
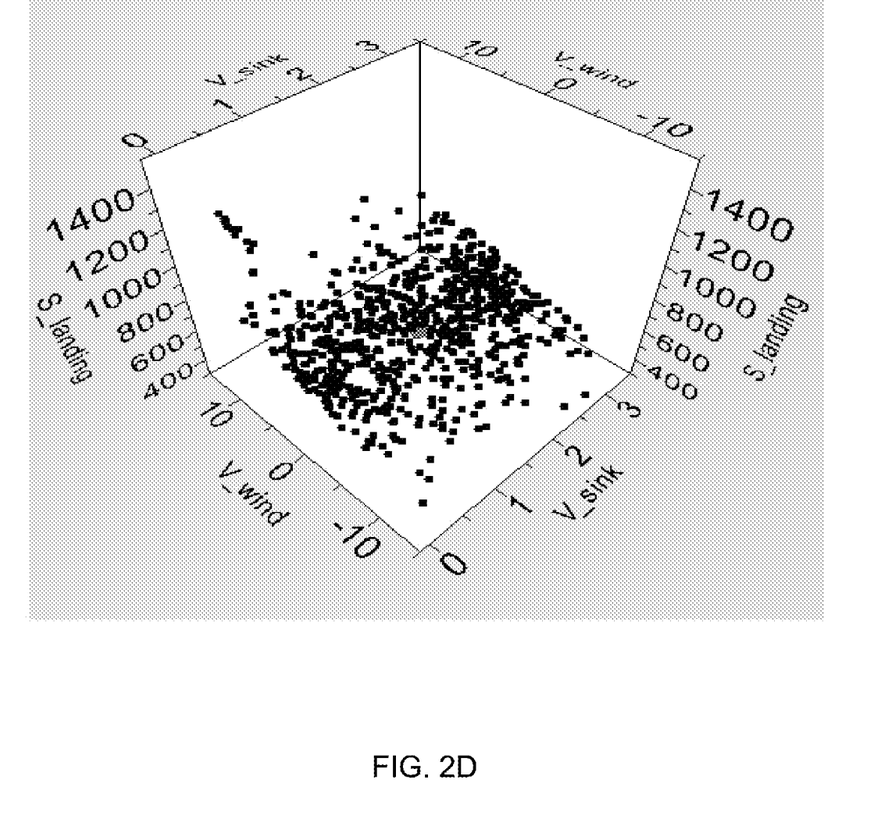

FIGS. 2B and 2C illustrate a simulation in which two verification parameters are used, e.g., the aircraft state sink speed (indirectly pilot controlled) is shown in FIG. 2B and the context wind speed (head or tail) is shown in FIG. 2C. Uniform probabilities are assumed for the sink speed parameter as shown in FIG. 2B, and a normal distribution for the wind speed parameter is assumed as shown in FIG. 2C. Next, as shown in FIG. 2D a Monte Carlo simulation is performed whereby these parameters are randomly varied one thousand times based on their probability density functions, and simulated landing is then executed. This aircraft has the requirement that it needs to safely land at any airport with a runway in excess of 1500 meters. As shown in FIG. 2D, and even with this dense sampling in just two dimensions, the system meets this requirement, and no sample point predicts a runway length in excess of 1200 meters.

Figure 2E:
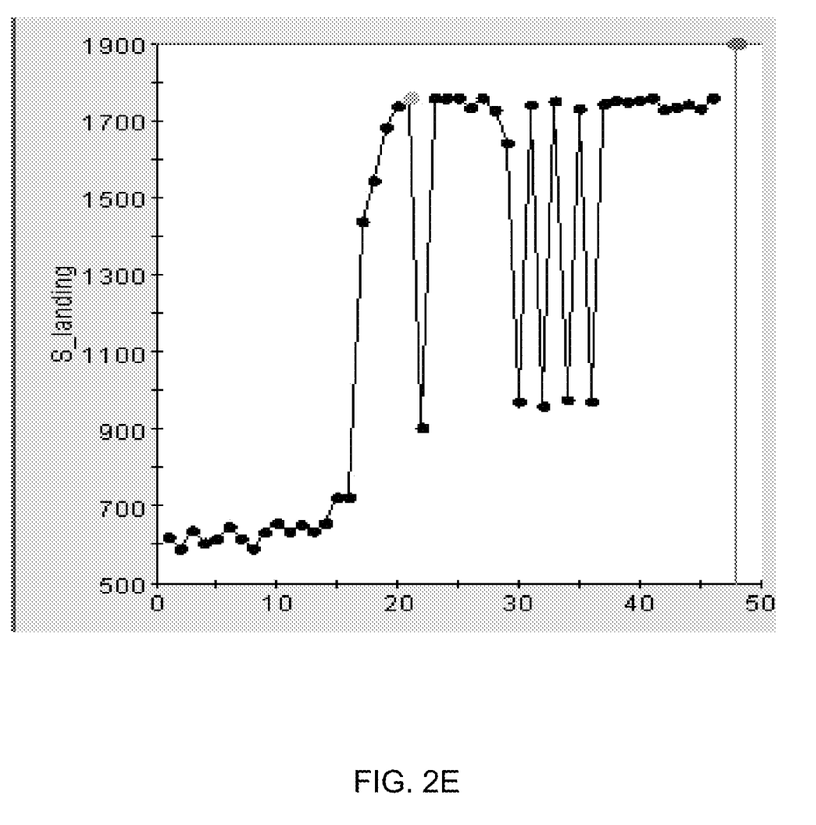
Figure 2F:
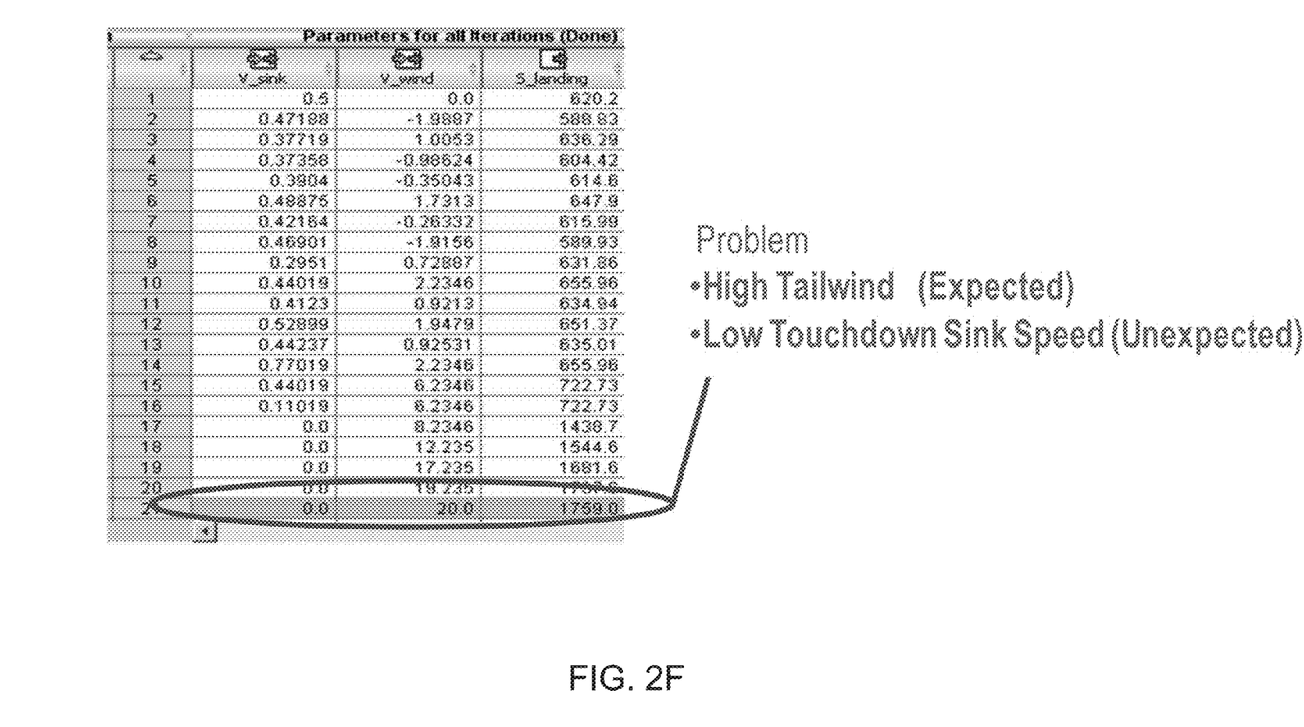

Next, and as shown in FIG. 2E, the counterexample objective is formulated. Specifically, the counterexample maximizes the landing distance, S_landing, for any combination of the sink speed and the wind speed. FIG. 2E illustrates that, using an optimization algorithm, this deterministic problem is solved in very few landing simulations. Specifically, within 19 simulations controlled by the optimizer a condition is found where a hypothetical runway length of 1553 meters is exceeded. Looking at the detailed iterations of the counterexample shown in FIG. 2F, it is clear how the Monte Carlo simulation did not include this result even after one thousand iterations. Obviously a high tail wind contributed, this was to be expected, because of the excess kinetic energy at touchdown. But notably, there is also the condition of zero sink speed. This is not an improbable situation due to an effort by pilots to land their aircraft with a near zero sink speed in order to maximize passenger comfort, i.e., with a more gentle touchdown. When this verification failure is more closely examined, it can be better understood what happened: At touch-down, the strut is so weakly depressed due to the "perfect landing" that the landing sensor did not trigger. This can have disastrous effects where a rule is in effect that the deployment of the thrust reverser can only occur in the landed state. The landed state was only achieved if the landing gear sensors triggered. In this counterexample case, the sensors do not trigger due to the weak depression of the strut and, hence, the state of the aircraft is not landed. This means that the thrust reverser system cannot be deployed and there is no way for the pilot to override this cyber physical system, as a consequence the aircraft overshot the runway. Accordingly, this counterexample verification illustrates that the allowed operational state of the aircraft needs to be modified to not allow landings below 0.1 m/s sink speed and/or the cyber-physical architecture and settings of sensors and actuators needs to be changed. This case could not have been found by decision tree safety analysis tools, because all components were working as intended and the pilot also flew the aircraft as intended. Monte Carlo simulation in this case cannot detect this catastrophic failure efficiently, especially not if the dimensionality of the failure interaction is increased.

Figure 3:
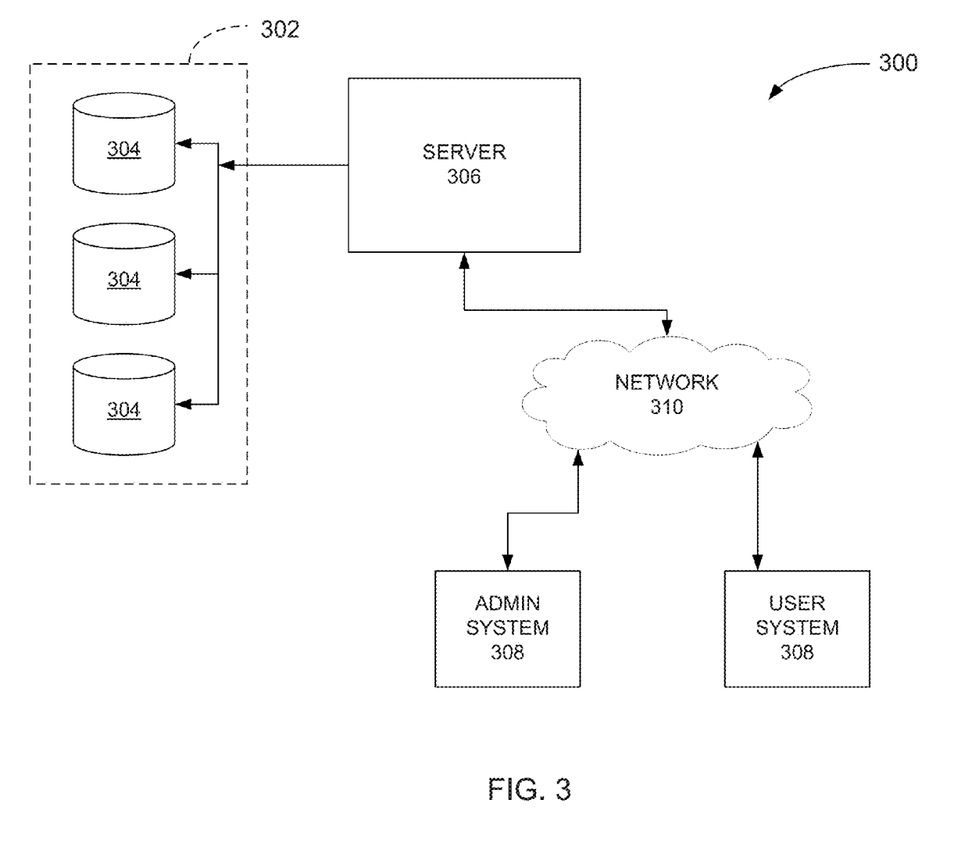
FIG. 3 is a schematic block diagram of an exemplary computer system for use in verifying a modeled object in a PLM system.

FIG. 3 is a schematic block diagram of an exemplary computer system 300 for use in verifying a modeled object in a PLM system, and/or for use in performing the processes described above and/or additional processes that may be related to those described above. In an exemplary embodiment, a memory area 302 includes one or more storage devices 304 for use in storing data, such as tolerance attribute values, simulation models, rules for use in simulating performance of the models and/or the outputs of such simulations, or any other suitable data. In some embodiments, the memory area 302 is coupled to a server system 306, which is in turn coupled to client systems 308 such as an administrator system and/or a user system, via a network 310. The storage devices 304 may be embodied as one or more databases, may be located at a single or at multiple geographical sites, or may be integrated with the server system 306.

As can be appreciated, the network 310 can be a public network, such as the Internet, or a private network such as an LAN or WAN network, or any combination thereof and can also include PSTN or ISDN sub-networks. The network 310 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 310 is merely exemplary and in no way limits the scope of the present advancements.

The client systems 308 can be any suitable computer architecture such as the one described below with reference to FIG. 4, or any other computing architecture that is known. Moreover, it should be understood that the server system 306 is configured to perform the processes described above and/or any additional processes that may be related to those described above.

The server system 306 stores the computer-readable instructions to execute the processes described above, and provides these instructions via the network 310 to the client systems 308. Moreover, the server system 306 can also provide data from the memory area 302 as needed to the client systems 308 such that the client systems 308 execute the processes described above. As such, FIG. 3 includes implementations of the computer system 300 via cloud computing, distributed computing, and the like.

During operation, the server system 306 defines a model and an envelope of its allowable states during an operational scenario. The server system 306 then stores these data in the memory area 304. The envelope of the allowable states during an operational scenario envelope includes a plurality of parameters to be optimized during operation and/or simulation analysis of the model. Next, the server system 306 stores requirements of model in the form of inequality constraints and/or equality constraints for a scenario in its context in the memory area 304. As noted above, the context of a scenario includes, but is not limited to terrain, water wave amplitude, wind, rainfall, corrosion, thermal dispersion, particle size, electromagnetic signal and noise (e.g., from solar radiation), and the like. As described above, the server system 306 derives a counterexample optimization objective from the requirements. Next, for each objective in a verification scenario, the server system 306 conducts a quality assurance process is conducted to optimize a set of parameters in the space of model states and context. If the server system 306 determines that a value of the objective exceeds a specified tolerance, the server system 306 redefines the model and its allowable states to correct the verification error. The server system 306 repeats the process until no additional failures are found after a preset number of iterations of this approach, i.e., until a specified MEBF is reached. In that case, the server system 306 marks the model is defined as verified (or qualified) in the memory area 304 with respect to the stored requirements.

Figure 4:
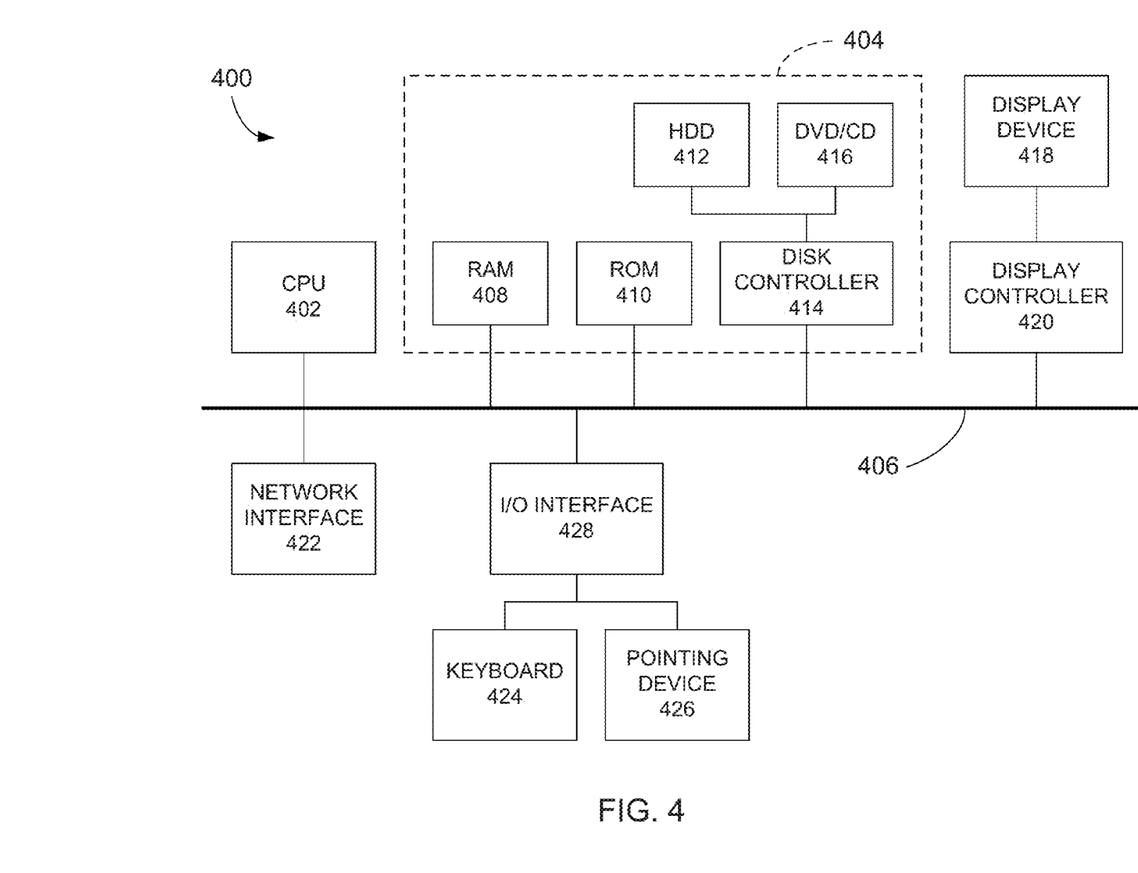
FIG. 4 is a schematic block diagram of an exemplary computer architecture for use with the server system and/or the client system shown in FIG. 3.

FIG. 4 is a schematic block diagram of an exemplary computer architecture 400 for use with the server system 306 and/or the client systems 308 (each shown in FIG. 3).

In an exemplary embodiment, the computer architecture 400 includes one or more processors 402 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 404 that is operably and/or communicatively coupled to the processor 402 by a system bus 406. A "memory area," as used herein, refers generally to any means of storing non-transitory program code and instructions executable by one or more processors to aid in verifying a modeled object in a PLM system, and/or for use in performing the processes described above and/or additional processes that may be related to those described above. The memory area 404 may include one, or more than one, forms of memory. For example, the memory area 404 may include random-access memory (RAM) 408, which can include non-volatile RAM, magnetic RAM, ferroelectric RAM, and/or other forms of RAM. The memory area 404 may also include read-only memory (ROM) 410 and/or flash memory and/or electrically-programmable read-only memory (EEPROM). Any other suitable magnetic, optical, and/or semiconductor memory, such as a hard-disk drive (HDD) 412, by itself or in combination with other forms of memory, may be included in the memory area 404. The HDD 412 may also be coupled to a disk controller 414 for use in transmitting and receiving messages to and from the processor 402. Moreover, the memory area 404 may also be, or may include, a detachable or removable memory 416, such as a suitable cartridge disk, CD-ROM, DVD, or USB memory. The above examples are exemplary only and, thus, are not intended to limit in any way the definition and/or meaning of the term "memory area."

The computer architecture 400 also includes a display device 418 that is coupled, such as operatively coupled, to a display controller 420. The display controller 420 receives data via the system bus 406 for display by the display device 418. The display device 418 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 418 may include a touchscreen with an associated touchscreen controller 420. The above examples are exemplary only and, thus, are not intended to limit in any way the definition and/or meaning of the term "display device."

In addition, the computer architecture 400 includes a network interface 422 for use in communicating with a network (not shown in FIG. 4). Moreover, the computer architecture 400 includes one or more input devices, such as a keyboard 424 and/or a pointing device 426, such as a roller ball, mouse, touchpad, and the like. The input devices are coupled to and controlled by an input/output (I/O) interface 428, which is further coupled to the system bus 406.

A description of the general features and functionality of the display device 418, keyboard 424, pointing device 426, as well as the display controller 420, disk controller 414, network interface 422, and I/O interface 428 is omitted herein for brevity as these features are known.

During operation, the processor 402 defines a model and an envelope of its allowable states during an operational scenario. The processor 402 then stores these data in the memory area 404. The envelope of the allowable states during an operational scenario envelope includes a plurality of parameters to be optimized during operation and/or simulation analysis of the model. Next, the processor 402 stores requirements of model in the form of inequality constraints and/or equality constraints for a scenario in its context in the memory area 404. As noted above, the context of a scenario includes, but is not limited to terrain, water wave amplitude, wind, rainfall, corrosion, thermal dispersion, particle size, electromagnetic signal and noise (e.g., from solar radiation), and the like. As described above, the processor 402 derives a counterexample optimization objective from the requirements. Next, for each objective in a verification scenario, the processor 402 conducts a quality assurance process is conducted to optimize a set of parameters in the space of model states and context. If the processor 402 determines that a value of the objective exceeds a specified tolerance, the processor 402 redefines the model and its allowable states to correct the verification error. The processor 402 repeats the process until no additional failures are found after a preset number of iterations of this approach, i.e., until a specified MEBF is reached. In that case, the processor 402 marks the model is defined as verified (or qualified) in the memory area 404 with respect to the stored requirements.

Exemplary embodiments of computer-implemented methods, computer systems, computer architectures, and computer program products for use in qualifying a model in a product lifecycle management (PLM) system are described above in detail. The computer-implemented methods, computer systems, computer architectures, and computer program products are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer system or computer architecture, such as those described herein, includes at least one processor or processing unit and a system memory. The computer system or computer architecture typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

Exemplary components include, for example, an input component that when executed by a processor causes the processor to define a model and an envelope of allowable model states. In some embodiments, the input component causes the processor to receive model properties and the allowable model states from via user input and to store the model properties and the allowable model states in a memory area. Moreover, in some embodiments, the input component causes the processor to store the one or more requirements in a memory area of the model for a specified scenario.

Another exemplary component is an iterative analysis component that when executed by a processor causes the processor to derive at least one counterexample objective based on one or more requirements, optimize a set of parameters related to the allowable model states, redefine the model and/or the allowable model states when the counterexample objective is outside of a specified tolerance, and define the model as verified after a predefined number of iterations. In some embodiments, the iterative analysis component causes the processor to conduct an assurance process for the at least one counterexample objective. Moreover, in some embodiments, the iterative analysis component causes the processor to compare the counterexample objective to the specified tolerance. Furthermore, in some embodiments, the iterative analysis component causes the processor to record in the memory area a number of sequential failures of the model, and perform analysis until a specified number of sequential failures is recorded. In addition, in some embodiments, the iterative analysis component causes the processor to derive the counterexample objective based on the one or more requirements and a contextual scenario of the model.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for verifying a model in a product lifecycle management (PLM) system, said computer-implemented method comprising:
defining, using a computer, a model, an allowable model context, and an envelope of allowable model states;
based on one or more requirements, deriving, using the computer, at least one counterexample objective;
optimizing, using the computer, a set of parameters related to the allowable model states;
optimizing, using the computer, a set of parameters related to the allowable model context;

redefining, using the computer, at least one of the model and the allowable model states when the at least one counterexample objective is outside of a specified tolerance; and after a predefined number of iterations, defining, using the computer, the model as verified.

2. A computer-implemented method in accordance with claim 1, further comprising storing the model and the allowable model states in a memory area.

3. A computer-implemented method in accordance with claim 1, further comprising receiving model properties, the allowable model context, and the allowable model states from via user input.

4. A computer-implemented method in accordance with claim 1, further comprising storing in a memory area the one or more requirements of the model for a specified scenario.

5. A computer-implemented method in accordance with claim 1, further comprising conducting an assurance process for the at least one counterexample objective.

6. A computer-implemented method in accordance with claim 1, further comprising comparing the at least one counterexample objective to the specified tolerance.

7. A computer for use in qualifying a model in a product lifecycle management (PLM) system, said computer comprising:
a memory area configured to store a model, an allowable model context, and an envelope of allowable model states; and
a processor coupled to said memory area, said processor configured to:
based on one or more requirements, derive at least one counterexample objective;
optimize a set of parameters related to the allowable model states;
optimize a set of parameters related to the allowable model context;
redefine at least one of the model and the allowable model states when the at least one counterexample objective is outside of a specified tolerance; and
after a predefined number of iterations, define the model as verified.

8. A computer in accordance with claim 7, wherein said processor is further configured to receive model properties, the allowable model context, and the allowable model states from via user input.

9. A computer in accordance with claim 7, wherein said memory area is further configured to store the one or more requirements of the model for a specified scenario.

10. A computer in accordance with claim 7, wherein said processor is further configured to conduct an assurance process for the at least one counterexample objective.

11. A computer in accordance with claim 7, wherein said processor is further configured to compare the at least one counterexample objective to the specified tolerance.

12. A computer in accordance with claim 7, wherein said processor is further configured to:
record in said memory area a number of sequential failures of the model; and
perform analysis until a specified number of sequential failures is recorded.

13. A computer in accordance with claim 7, wherein said processor is configured to derive the at least one counterexample objective based the on one or more requirements and a contextual scenario of the model.

14. A computer program product comprising:
one or more non-transitory computer-readable storage media having computer-executable components thereon for use in verifying a model in a product lifecycle management (PLM) system, said components comprising:
an input component that when executed by a processor causes the processor to define a model, an allowable model context, and an envelope of allowable model states; and
an iterative analysis component that when executed by a processor causes the processor to:
based on one or more requirements, derive at least one counterexample objective;
optimize a set of parameters related to the allowable model states;
optimize a set of parameters related to the allowable model context;
redefine at least one of the model and the allowable model states when the at least one counterexample objective is outside of a specified tolerance; and
after a predefined number of iterations, define the model as verified.

15. A computer program product in accordance with claim 14, wherein said input component further causes the processor to receive model properties, the allowable model context, and the allowable model states from via user input and to store the model properties, the allowable model context, and the allowable model states in a memory area.

16. A computer program product in accordance with claim 14, wherein said input component causes the processor to store the one or more requirements in a memory area of the model for a specified scenario.

17. A computer program product in accordance with claim 14, wherein said iterative analysis component further causes the processor to conduct an assurance process for the at least one counterexample objective.

18. A computer program product in accordance with claim 14, wherein said iterative analysis component further causes the processor to compare the at least one counterexample objective to the specified tolerance.

19. A computer program product in accordance with claim 14, wherein said iterative analysis component causes the processor to:
record in the memory area a number of sequential failures of the model; and
perform analysis until a specified number of sequential failures is recorded.

20. A computer program product in accordance with claim 14, wherein said iterative analysis component further causes the processor to derive the at least one counterexample objective based the on one or more requirements and a contextual scenario of the model.

* * * * *